United States Patent [19]
Piret

[11] 3,776,066
[45] Dec. 4, 1973

[54] AUTOMATIC TRANSMISSIONS
[75] Inventor: Jean Piret, Bougival, France
[73] Assignees: Automobiles Peugeot, Paris; Regie Nationale Des Usines Renault, Billancourt, both of France
[22] Filed: Nov. 22, 1971
[21] Appl. No.: 200,985

[30] Foreign Application Priority Data
Dec. 2, 1970 France.................................. 7043298

[52] U.S. Cl. ................................................. 74/763
[51] Int. Cl. ............................................. F16h 57/10
[58] Field of Search............................... 74/763, 762

[56] References Cited
UNITED STATES PATENTS
3,584,520   6/1971   Borman ............................... 74/763
3,611,835   10/1971  Borman ............................... 74/759
3,678,783   7/1972   O'Malley et al. .................. 74/763 X Primary Examiner—Arthur T. McKeon
Attorney—Robert S. Swecker

[57] ABSTRACT

Automatic transmission having an input shaft and output shaft which may be disposed on the same side or opposite sides of the transmission. A planetary gearset has its ring gear, two coaxial sun gears and a planetary gear carrier respectively integral with the output shaft, a brake mechanism and a clutch mechanism the selective actuation of which determines the engagement of the suitable transmission ratio. An inner shaft portion and an outer shaft portion are coaxial and relatively rotatable. The inner shaft portion is integral with a hub of the first clutch mechanism and the first sun gear and the outer shaft portion is integral with a drum of the second clutch mechanism and the second sun gear. Means are provided for respectively affording in both types of transmission, a bearing between the input shaft and the end of the inner shaft portion opposed to the first sun gear end thereof, and an axial abutment for resiliently yieldable return means for the first clutch mechanism and an axial abutment for the two shaft portions.

10 Claims, 4 Drawing Figures

AUTOMATIC TRANSMISSIONS

The present invention relates to transmission mechanisms having an automatic gear change or automatic transmissions employed in particular in automobile vehicles.

It is known that in such transmissions, as in conventional mechanical transmissions, the input and output shafts may be disposed on the same side or on opposite sides of the transmission case. Usually it is of course desirable that the number of parts common to these two types of transmission be maximum so as to reduce the total number of parts to be manufactured and thus reduce the manufacturing price of each individual transmission.

The main object of the invention is to provide an automatic transmission which can be easily adapted for either of the aforementioned types.

The invention provides an automatic transmission comprising an input shaft and an output shaft which may be disposed on each side or on the same side of the transmission case, a planetary gearset comprising a ring gear, two coaxial sun gears, a planet gear carrier, the elements of said planetary gearset being respectively integral with the output shaft, the brake mechanism and the clutch mechanism having friction discs the selective tightening of which determines the engagement of the suitable transmission ratio, two coaxial shaft portions mounted to be rotatable relative to each other, the inner shaft portion being integral with the hub of the first clutch and the first sun gear and the outer shaft portion being integral with the drum of the second clutch and the second sun gear, means for respectively affording, in each of the two types of transmission, a bearing between the input shaft and the end of the inner shaft portion opposed to that on which the first sun gear is keyed, and the axial abutment for resiliently yieldable return means for the first clutch mechanism and the axial abutment of the two shaft portions.

In the embodiment of the transmission in which the input shaft and output shaft are disposed in opposed relation, the end of the input shaft extends inside the inner shaft portion for a part of the length of the latter and said means comprise an intermediate element which is connected to rotate with said input shaft and comprises a cylindrical portion and a radial flange, said cylindrical portion defining a bearing face for said inner shaft portion whereas the two faces of the radial flange constitute abutment faces for the resiliently yieldable return means of the first clutch mechanism and for the two shaft portions.

In the second embodiment of the transmission in which the input shaft and the output shaft are disposed on the same side of the transmission, the input shaft extends into the inner shaft portion throughout the length of the latter and carries at its periphery the bearing face for the inner shaft portion, said means comprising a washer which is fixed to the inner shaft portion and acts as an axial abutment for the resiliently yieldable return means of the first clutch and for the two shaft portions.

According to another feature of the invention, the outer shaft portion carries the hub of a freewheel mechanism and the bearing face between said hub and the shaft portion is rendered floating so as to be capable of absorbing defects of alignment of the inner shaft portion, said floating arrangement being for example achieved either by providing a slight clearance between the bore of the case of the transmission and the outer periphery of the brake cylinder disposed in the region of the freewheel mechanism and integral with the outer ring of said mechanism or by connecting said outer ring to the brake cylinder by means of a resiliently yieldable radially deformable ring.

Further features and advantages of the invention will be apparent from the ensuing description with reference to the accompanying drawings given solely by way of example and in which:

FIGS. 3 and 4 are detail views of two modifications.

Such an automatic transmission or gear box comprises in the known manner in a case C, an input shaft 1A (FIG. 1) or 1B (FIG. 2) integral with the drum 2 of a first clutch E1, a second clutch E2, two brake mechanisms F1, F2, a free-wheel mechanism RL, and a planetary gearset P having in the presently-described embodiment a ring gear CP which constitutes the element connected to the output shaft 3A, 3B of the transmission.

It is unnecessary to describe these various parts of the transmission in detail and merely the parts necessary for the description of the operation of the invention will be mentioned in the course of the ensuing description.

Figure 1:
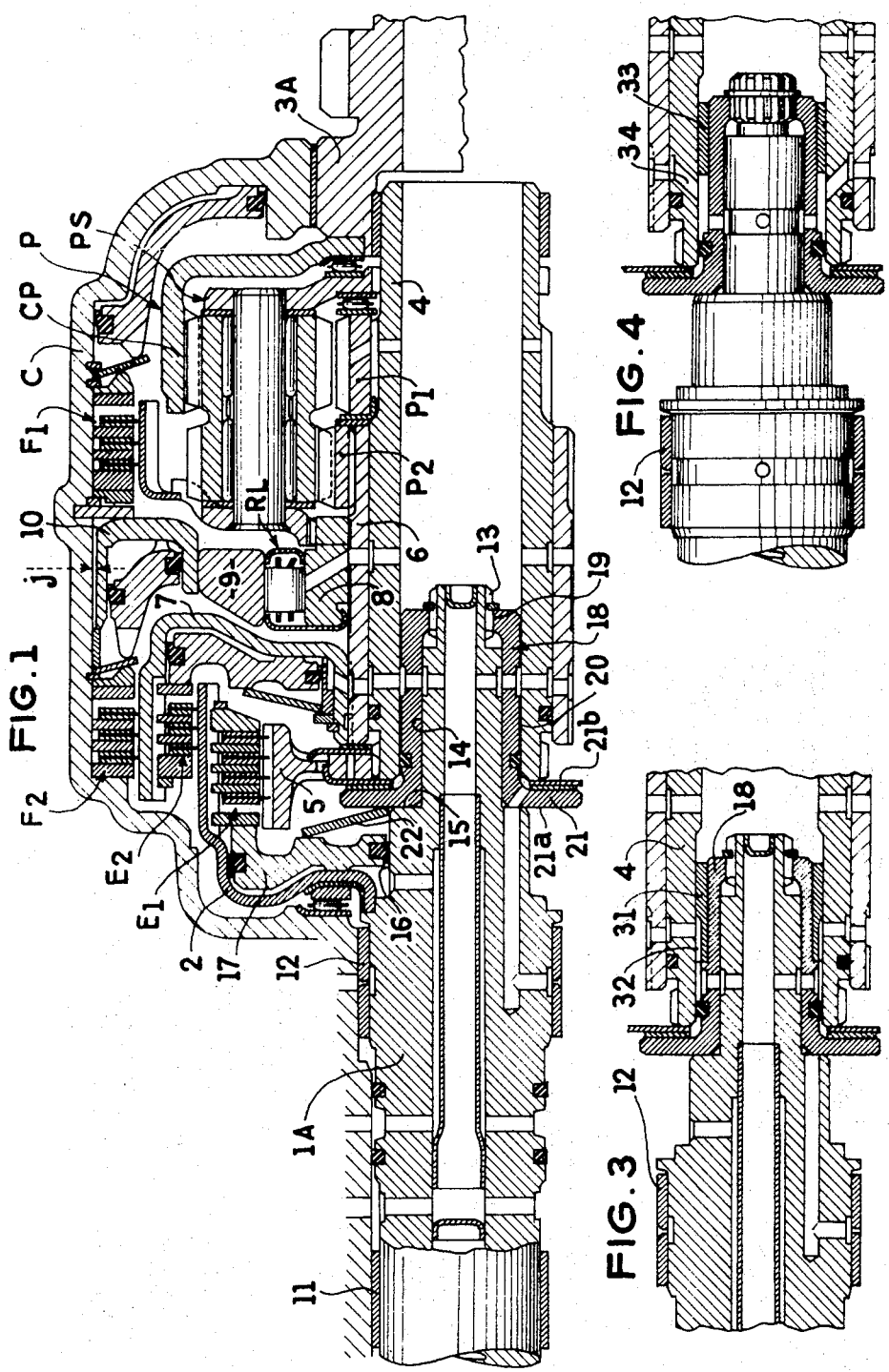
FIG. 1 is a partial longitudinal sectional view of an automatic transmission or gear box according to the invention which is of the type having the input and output shafts disposed on opposite sides of the transmission.
Figure 2:
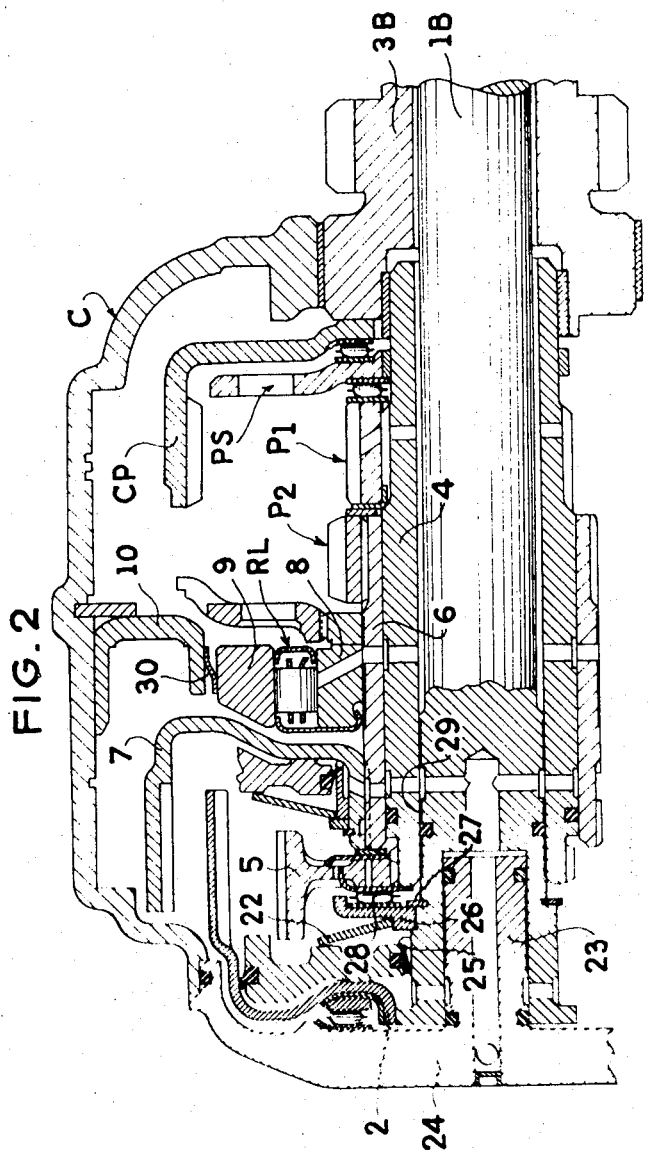
FIG. 2 is a view similar to FIG. 1 of a transmission of the type in which the input shaft and output shaft are disposed on the same side.

With reference to either FIG. 1 or FIG. 2, the sun gear P1 is connected to rotate with a tubular first or inner shaft 4. At the opposite end of the latter there is keyed a hub 5 carrying one of the two series of discs of the clutch E1. Rotatably mounted on the first shaft is a second or outer tubular shaft 6 to which are connected to rotate therewith: the sun gear P2 and the drum 7 of the second clutch E2. Rotatably mounted on the second shaft 6 is the hub 8 of the free-wheel mechanism whose outer ring 9 is integral with a brake cylinder 10.

In the embodiment shown in FIG. 1, it can be seen that the input shaft 1A of the transmission is journalled in two fixed bearings 11, 12 and that this shaft has a stepped part defining a splined end portion 13, a cylindrical intermediate portion 14, a shoulder 15, and a cylindrical portion 16 on which the piston 17 of the clutch mechanism E1 is slidable. This input shaft carries, as can be seen in FIG. 1, a ring 18 which is connected to rotate with the input shaft by splines 19 complementary to the splines 13 and has a cylindrical portion 20 and a radial flange 21. The cylindrical portion of the ring is metallized so as to constitute a bearing face for the tubular shaft portion 4 whereas the two faces 21a and 21b of the flange act respectively as an axial abutment for the return spring 22 for the piston 17 (this spring being constituted for example by a Belleville washer or a diaphragm spring) and an axial abutment or thrust bearing for the shafts 4, 6 carrying the sun gears P1 and P2.

The axial abutment for the tubular shafts 4, 6 serves to absorb the forces transmitted thereto by the sun gears P1, P2 when the mechanism is driven in the direction from the wheels to the engine; it is therefore a "retro" abutment corresponding to operation in which the engine is employed as a brake. This abutment is afforded to the outer shaft portion 6 through the medium of the hub 5 of the clutch E1.

It will also be observed that clearance $j$ is provided between the brake cylinder 10 and the case of the transmission.

With reference to FIG. 2, it can be seen that most of the parts just described are inside a transmission or gear box in which the input shaft 1B and the output shaft 3B are disposed on the same side of the transmission case, that is, on the right side as viewed in FIG. 2. Like parts have like reference numbers. The input shaft extends through the inner shaft 4 and its left end, as viewed in FIG. 2, is rotatably mounted on a cylindrical journal 23 carried by an end cover 24 of the transmission case. This end of the shaft is integral with the clutch drum 2 and defines, as in the preceding embodiment, a cylindrical face 25 on which the piston 17 of the clutch E1 is slidably mounted. A washer 26 having an S-shaped section is fitted on this shaft and held in position by means of a resiliently yieldable ring 27, said washer acting as an abutment for the return spring 22 of the piston of the clutch and also serving as a support for a needle thrust bearing 28 which replaces the smooth thrust bearing of the first embodiment. In its part in front of the left end of the inner shaft 4, the input shaft 1B is metallized and constitutes a bearing face 29 for this shaft 4.

FIG. 2 also shows a slight modification whereby it is possible to achieve a floating assembly of the bearing between the hub 8 of the free-wheel mechanism and the brake cylinder 10. Whereas in the embodiment shown in FIG. 1 this was achieved by providing a clearance J between the outer periphery of the brake cylinder 10 and the inner wall of the transmission case, in this modification, the same result is obtained by providing between the outer ring 9 of the free-wheel mechanism and the brake cylinder 10 a resiliently yieldable element 30 having a flattened S-shaped section whose two edges are respectively welded to the outer ring and to the cylinder. This element is consequently capable of transmitting torque between the elements 9 and 10.

As concerns the operation of these two transmissions, it is unnecessary to repeat the kinematic chain whereby it is possible to obtain between the input shaft and the output shaft the required transmission ratio. Consequently, merely the points which directly relate to the improvements according to the invention will be mentioned.

It will be observed that in both embodiments, the region (20, 29) in which the inner shaft 4 bears on the input shaft is sufficiently near the region in which this input shaft bears on the case, namely the bearing 12 in case of FIG. 1 and the journal 23 in the case of FIG. 2, for the load supported by this bearing 12 and journal 23 to be minimum and that the geometric deviations or defects of alignmemt of the bearing 20, resulting from inevitable clearance in the bearings 11 and 12, are also reduced. Further, the position of this bearing region (20, 29) between the input shaft and the inner shaft 4, associated with the floating character of the bearing between the outer shaft 6 and the case C, allow defects of alignment of the axis of the shaft 4 of the order of for example 5/100 mm.

It will be observed that in the case of the embodiment shown in FIG. 1, the arrangement proposed is of particular interest, since a single part, namely the flanged ring 18, performs simultaneously the function of a bearing for the inner shaft 4 and the function of an axial abutment for the resiliently yieldable return means of the piston of the clutch and for the two shafts 4 and 6 which, when the drive is effected in the direction from the wheels to the engine, that is, when using the engine as a brake, tend to be displaced to the left as viewed in the drawing. It will also be noticed that the axial extent of this ring in the region of the flange 21 is much smaller than if it were necessary to employ a resiliently yieldable ring mounted in a groove in the shaft to afford the abutment for the Belleville washer or diaphragm 22 and a separate abutment ring for receiving the axial forces from the sun gears P1 and P2. Moreover, it is well known that it is particularly difficult to achieve a correct geometrical arrangement for such abutment rings whose radial face must be perfectly perpendicular to the axis of the transmission.

The object of the invention is moreover achieved, since the only parts which differ in the two transmissions shown in FIGS. 1 and 2 are: the input shaft, the end cover of the transmission case and the axial abutment means (21 in FIG. 1 and 26 in FIG. 6). All the other parts can be strictly identical.

The modification shown in FIG. 3 concerns the utilization, in a transmission having opposed input and output shafts, of bearing rings 31 which replace the metallized bearing faces shown in FIGS. 1 and 2. These rings 31 have the feature of being recessed at 32 on a part of their length so as to allow the passage of hydraulic fluid to the piston and cylinder device actuating the clutch E2 by way of passages in the shaft 4 and passages in the shaft 6, the rings 31 afford a bearing between the shaft 4 and the ring 18 on a sufficient length and at a point relatively near the bearing 12.

In another modification shown in FIG. 4, un-notched bearing rings 33 are employed, the passages 34 formed in the intermediate shaft portion 4 being then oblique so as to avoid the necessity of an excessive reduction in the length of said rings.

In the various illustrated embodiments, the invention has been employed only in a specific type of transmission in which the clutch drums 2 and 7 are mounted in opposition and the planetary gearset is of the "Ravigneaux" type. However, it must be understood that the invention is also applicable to transmissions or gear boxes of different construction with the same advantages especially as concerns an increased standardization for transmissions which are similar but have opposed input and output shafts.

Having now described our invention what we claim and desire to secure by Letters Patent is:

1. An automatic transmission comprising means defining an outer case, an input shaft and an output shaft which shafts are coaxially rotatably mounted relative to the case, a planetary gearset having a ring gear, two coaxial sun gears, planetary gears and a planetary gear carrier, a first clutch mechanism, a second clutch mechanism, each of the clutch mechanisms comprising a drum, an inner hub and releasably interengageable friction elements for interconnecting the drum and the hub, the first clutch mechanism including resiliently yieldable return means for releasing the corresponding drum from connection to the corresponding hub, releasable brake means, the clutch mechanisms and brake means being arranged and combined with the planetary gearset for achieving suitable transmission ratios between the input shaft and output shaft, the ring gear being integral with the output shaft and the drum of the first clutch mechanism being integral with the input shaft, an inner shaft and an outer shaft encompassing the inner shaft, the inner and outer shafts being coaxial and mounted to be rotatable relative to each other and relative to the case, the inner shaft having an end portion which is integral with the hub of the first clutch mechanism and a second portion integral with the first sun gear of said sun gears and the outer shaft being integral with the drum of the second clutch mechanism and integral with a second sun gear of the sun gears, means for rotatably mounting the input shaft in said end portion of the inner shaft, and axial abutment carried by the input shaft for the resiliently yieldable return means of the first clutch mechanism and for taking axial thrust from the inner shaft and outer shaft.

2. An automatic transmission comprising means defining an outer case, an input shaft and an output shaft which shafts are coaxially rotatably mounted relative to the case, a planetary gearset having a ring gear, two coaxial sun gears, planetary gears and a planetary gear carrier, a first clutch mechanism, a second clutch mechanism, each of the clutch mechanisms comprising a drum, an inner hub and releasably interengageable friction elements for interconnecting the drum and the hub, the first clutch mechanism including resiliently yieldable return means for releasing the corresponding drum from connection to the corresponding hub, releasable brake means, the clutch mechanisms and brake means being arranged and combined with the planetary gearset for achieving suitable transmission ratios between the input shaft and output shaft, the ring gear being integral with the output shaft and the drum of the first clutch mechanism being integral with the input shaft, an inner shaft and an outer shaft encompassing the inner shaft, the inner and outer shafts being coaxial and mounted to be rotatable relative to each other and relative to the case, the inner shaft having an end portion which is integral with the hub of the first clutch mechanism and a second portion integral with a first sun gear of said sun gears and the outer shaft being integral with the drum of the second clutch mechanism and integral with a second sun gear of said sun gears, means for rotatably mounting the input shaft in said end portion of the inner shaft, and an axial abutment carried by the input shaft for the resiliently yieldable return means of the first clutch mechanism and for taking axial thrust from the inner shaft and outer shaft, the input shaft and output shaft extending out of the case at opposite ends of the case and the input shaft extending into the inner shaft for a part of the length of the inner shaft and said means for rotatably mounting comprising an intermediate member which is connected to rotate with the input shaft and which has a cylindrical portion and a radial flange, the cylindrical portion affording a bearing face for the inner shaft and the radial flange constituting said axial abutment for the resiliently yieldable return means of the first clutch mechanism and for taking thrust from the inner and outer shafts.

3. A transmission as claimed in claim 2, wherein the cylindrical portion of the intermediate member has a metallized surface so as to constitute said bearing face.

4. A transmission as claimed in claim 2, wherein the cylindrical portion of the intermediate member carries a ring which acts as a bearing for the inner shaft.

5. A transmission as claimed in claim 4, wherein passageways are provided in th input shaft for connection to a source of hydraulic fluid, a radial passage is formed in the cylindrical portion of the intermediate member and said ring has recess means in a part of its length so that the hydraulic fluid can flow through the passageways, the radial passage and the recess means.

6. A transmission as claimed in claim 4, wherein an inclined passage is provided in the inner shaft and passageways provided in the input shaft and in the cylindrical portion of the intermediate member communicate with the inclined passage for supplying hydraulic fluid.

7. An automatic transmission comprising means defining an outer case, an input shaft and an output shaft which shafts are coaxially rotatably mounted relative to the case, a planetary gearset having a ring gear, two coaxial sun gears, planetary gears and a planetary gear carrier, a first clutch mechanism, a second clutch mechanism, each of the clutch mechanisms comprising a drum, an inner hub and releasably interengageable friction elements for interconnecting the drum and the hub, the first clutch mechanism including resiliently yieldable return means for releasing the corresponding drum from connection to the corresponding hub, releasable brake means, the clutch mechanisms and brake means being arranged and combined with the planetary gearset for achieving suitable transmission ratios between the input shaft and output shaft, the ring gear being integral with the output shaft and the drum of the first clutch mechanism being integral with the input shaft, an inner shaft and an outer shaft encompassing the inner shaft, the inner and outer shafts being coaxial and mounted to be rotatable relative to each other and relative to the case, the inner shaft having an end portion which is integral with the hub of the first clutch mechanism and a second portion integral with a first sun gear of said sun gears and the outer shaft being integral with the drum of the second clutch mechanism and integral with a second sun gear of said sun gears, means for rotatably mounting the input shaft in said end portion of the inner shaft, and an axial abutment carried by the input shaft for the resiliently yieldable return means of the first clutch mechanism and for taking axial thrust from the inner shaft and outer shaft, the input shaft and output shaft extending out of the case on the same side of the case and the input shaft extending through the inner shaft throughout the length of the inner shaft, an end cover of the case of the transmission carrying a bearing face on which the input shaft is rotatably mounted, said means for rotatably mounting comprising a bearing face on the periphery of the input shaft and said axial abutment comprising a washer fixed to the input shaft.

8. A transmission as claimed in claim 11, comprising a free-wheel mechanism comprising a hub and an outer ring, the hub being mounted on the outer shaft so that the free-wheel mechanism is floatable relative to the case.

9. A transmission as claimed in claim 8, wherein said floatable mounting comprises a clearance between the case and a brake cylinder of said brake means which cylinder is integral with the outer ring of the free-wheel mechanism.

10. A transmission as claimed in claim 8, wherein the floatable mounting comprises an S-sectioned ring between and interconnecting a brake cylinder of said brake means and the outer ring of the free-wheel mechanism so that said outer ring and said cylinder rotate together.

* * * * *